May 4, 1926.  
C. SUNDSTROM ET AL  
1,583,663  
PROCESS OF FORMING SODIUM CARBONATE  
Filed Nov. 19, 1923
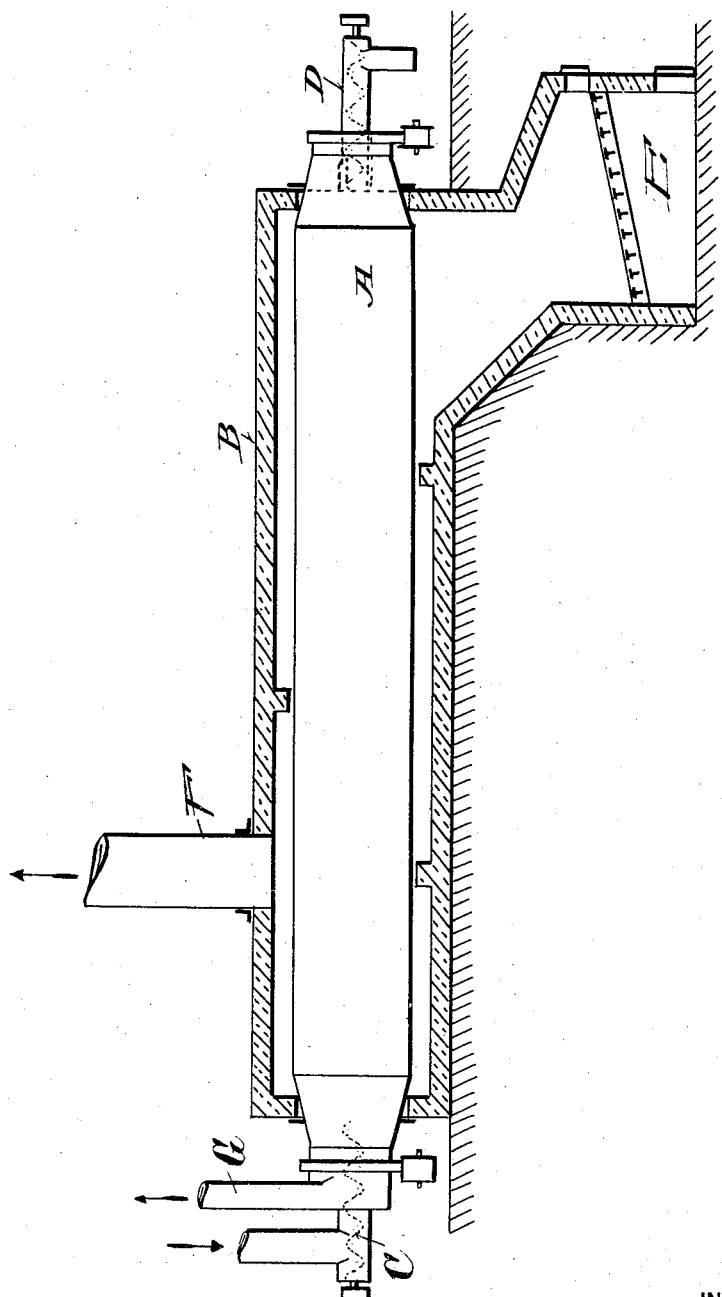
INVENTORS  
Carl Sundstrom  
George N. Tezier  
BY Their ATTORNEY  
Clarkson A. Collins Patented May 4, 1926.

1,583,663

UNITED STATES PATENT OFFICE.

CARL SUNDSTROM AND GEORGE N. TERZIEV, OF SYRACUSE, NEW YORK, ASSIGNORS TO THE SOLVAY PROCESS COMPANY, OF SOLVAY, NEW YORK, A CORPORATION OF NEW YORK.

PROCESS OF FORMING SODIUM CARBONATE.

Application filed November 19, 1923. Serial No. 675,560.

*To all whom it may concern:*

Be it known that we, CARL SUNDSTROM and GEORGE N. TERZIEV, citizens of the United States, residing at Syracuse, in the county of Onondaga and State of New York, have invented a new and Improved Process of Forming Sodium Carbonate, of which the following is a specification.

As is known if sodium bicarbonate be heated at a temperature and for a time insufficient to convert it into sodium carbonate, a sodium carbonate is formed intermediate between the bicarbonate and carbonate having the formula $$Na_2CO_3.3NaHCO_3,$$

and the form of fine needle-like crystals. It has also been found that if this compound be heated further, for example at the temperature used to convert sodium bicarbonate into sodium carbonate, sodium carbonate will be formed but characterized by the same fine needle-like particles as the compound above defined.

The object of our present improvements is to produce continuously and directly sodium carbonate having this structure so that the result will be a soft fluffy product of low density and to accomplish this in a single operation and in an efficient manner.

To accomplish this we cause sodium bicarbonate or a mixture of bicarbonate and a sodium carbonate compound, suitable for the formation of $$Na_2CO_3.3NaHCO_3$$

such for instance as is described in our copending application U. S. S. N. 601,158, now Patent No. 1,473,259, of November 6, 1923, to pass first through a zone of relatively low temperature not substantially exceeding 100° C., such time being occupied in the movement as is requisite to effect conversion of bicarbonate or bicarbonate mixture, into said compound. A certain amount of water either as liquid or vapor should be present during this heating operation.

The resulting product then passes directly and continuously into a zone of higher temperature, ranging from about 100° C. upward wherein it is subjected to a sufficient temperature and for a sufficient time to convert it into sodium carbonate.

In the accompanying drawing we have shown a diagrammatic illustration of a form of apparatus by which the process can be conveniently carried into effect and by reference to which the invention will be best understood.

Referring to the drawing, A indicates a rotatable cylindrical shell, or dryer enclosed within a chamber, B, provided at one end with means, as a worm, C, for charging material at a graduated speed into the cylinder and having at the other end an outlet, with a similar worm, D, whereby material is discharged therefrom. E, indicates means for heating the cylinder, A, consisting, as shown of a furnace, or fire box, so located that the hot gases of combustion enter the chamber, B, at the outlet, or discharge end of the cylinder, A, whence they pass along through the chamber, B, on the outside of the cylinder, A, to a stack, F.

The stack, F, is located about one-third of the length of the cylinder, A, from the feed end thereof, so that the hot gases of combustion are not directly applied to heat that portion of the cylinder, A, between the stack and the feed, and a lower temperature is maintained therein than in that part of the cylinder beyond the stack, F.

In carrying the process into effect the material to be employed, for example, a mixture of crude sodium bicarbonate of the ammonia soda process (with 12–15% moisture content), and sodium carbonate in approximately combining proportions to form the compound $$Na_2CO_3.3NaHCO_3,$$

is fed into the cylinder, A, by the worm, C, and moves slowly forward through the cylinder. The heating of the cylinder, A, is so adjusted that in that part of it adjacent to the feed between the feed end of the cylinder and the stack, F, the temperature will not substantially exceed 100° C. preferably 75–110° C., the heating gases being drawn off through the stack, F, so that the material fed in first passes through a zone in which the temperature will not substantially exceed 100° C. and the rate of movement is so adjusted that before the material passes out of this zone, the desired conversion into the compound $Na_2CO_3.3NaHCO_3$ takes place. This part of the process will ordinarily be completed in about half an hour.

The product thus formed then enters a zone beyond the stack, F, wherein the temperature exceeds 100° C. and is therein converted into sodium carbonate, and as such is discharged from the cylinder, about one hour being required for the passage of the material through this part of the cylinder. An end temperature (at D) of 190° C. is satisfactory. The gases and vapors evolved or generated in the cylinder A pass out through the stack G. The closed nature of the cylinder, A, except for the relatively small opening of the stack, G, and the external and not internal heating of the cylinder with the current of hot combustion gases, tends to check the too rapid escape of the evolved vapors thereby to maintain water either as liquid or vapor in the low temperature portion of the cylinder, A.

The sodium carbonate thus formed is of very low density and is a light fluffy mass. Thus if the density of ordinary soda ash be represented by 500–660, (the weight in grams of a litre of the substance when loosely packed) a soda ash can be produced by our process with a density for example as low as 270. It is also characterized by the same fine needle-like particles as the compound $(Na_2CO_3.3NaHCO_3)$ from which it is formed. The density of the product may be varied as desired by controlling the relative degree of conversion of the initial material into the intermediate carbonate-bicarbonate compound. This is readily accomplished for example by varying the carbonate-bicarbonate ratio of the material used, the temperature of the first heating zone, or the rate of flow of the material through this heating zone. Thus a product of density greater than 270 is obtained for example by increasing the relative amount of carbonate in the initial material used.

Our invention thus provides for the production of a sodium carbonate of the desired low density and light fluffy nature or of needle-like particles directly and continuously from the crude bicarbonate of the ammonia-soda process and from suitable bicarbonate mixtures. Only one piece of apparatus is required and a single source of heat. There is no intermediate handling of the materials and the heat content of the $Na_2CO_3.3NaHCO_3$ material is not lost but is utilized directly in the further transformation of this latter material into sodium carbonate. When in the claims we speak of the compound $Na_2CO_3.3NaHCO_3$ we mean the substance discovered by Herbert Edwin Cocksedge (described in his application 598,020) and which is characterized by its needle-like crystal form or by its distinctive refractive indices of α about 1.435 and γ about 1.526.

Having thus described our invention what we claim as new and desire to secure by Letters Patent is:—

1. The process of forming sodium carbonate which consists in causing sodium bicarbonate to move through a heated zone of substantial area and restricting the temperature in said zone so that it does not therein substantially exceed 100° C. and maintaining the material in said zone until substantial amounts of the compound $Na_2CO_3.3NaHCO_3$ are formed and then moving the resulting product through a zone of higher temperature so as to convert the product of the first zone into sodium carbonate in the latter zone.

2. The process of forming sodium carbonate which consists in causing a mixture of sodium bicarbonate and sodium carbonate material to move through a heated zone of substantial area and restricting the temperature in said zone so that it does not therein substantially exceed 100° C. and maintaining the material in said zone until substantial amounts of the compound $Na_2CO_3.3NaHCO_3$ are formed and then moving the resulting product through a zone of higher temperature so as to convert the product of the first zone into sodium carbonate in the latter zone.

3. The process of forming sodium carbonate which consists in heating a rotating drying cylinder by the external application of hot gases thereto so as to maintain in a portion thereof a temperature not substantially exceeding 100° C. and in the remaining portions thereof, a temperature above 100° C., passing sodium bicarbonate through said first mentioned portion at such speed as to form the sodium compound $Na_2CO_3.3NaHCO_3$ and then passing the resulting product through said second portion so as to convert it into sodium carbonate and finally discharging the carbonate from the cylinder.

4. The process of forming sodium carbonate which consists in causing a mixture of crude sodium bicarbonate of the ammonia soda process and sodium carbonate to pass continuously through a heated zone of substantial area and restricting the temperature in said zone so that it does not substantially exceed 100° C. maintaining the material in said zone until substantial amounts of the compound $$Na_2CO_3.3NaHCO_3$$

are formed and then moving the resulting product continuously through a zone of higher temperature so as to convert the product of the first zone into sodium carbonate in the latter zone.

5. The process of forming sodium carbonate which comprises continuously converting sodium bicarbonate material into $$Na_2CO_3.3NaHCO_3$$

and passing the resulting product directly and continuously through a zone maintained at a temperature appropriate to the conversion of sodium bicarbonate to sodium carbonate.

6. The process of forming a sodium carbonate product of low density which comprises causing crude sodium bicarbonate of the ammonia soda process to pass continuously and slowly through a zone of substantial area and restricting the temperature in said zone so that it approximates 100° C. and maintaining the material in said zone until substantial amounts of low density needle-like particles are formed and then moving the resulting product directly and continuously into and through a zone of higher temperature until the product is converted into sodium carbonate.

7. The process of continuously forming sodium carbonate which consists in continuously converting sodium bicarbonate material into material containing appreciable amounts of the compound $$Na_2CO_3.3NaHCO_3$$

and continuously changing said compound into sodium carbonate and throughout the whole procedure maintaining the material in substantially continuous motion.

8. The process of continuously forming sodium carbonate which consists in continuously converting a mixture of sodium bicarbonate and carbonate material into material containing appreciable amounts of the compound $$Na_2CO_3.3NaHCO_3$$

and continuously converting the said compound into sodium carbonate and throughout the whole procedure maintaining the material in substantially continuous motion.

9. The process of forming sodium carbonate which consists in continuously converting sodium bicarbonate into material containing appreciable amounts of the compound $$Na_2CO_3.3NaHCO_3$$

and immediately after the formation of said compound, decomposing the said compound into sodium carbonate and throughout the whole procedure maintaining the material in substantially continuous motion.

10. The process of continuously forming sodium carbonate which comprises continuously passing sodium bicarbonate material through a zone in which there is maintained a relatively low temperature until the material has acquired a lower density and particles constituting the material have acquired a needle-like structure and then directly and continuously subjecting the said product to a heat treatment in an immediately adjacent zone wherein a temperature appropriate to the conversion of bicarbonate to carbonate is maintained and wherein the low density needle-like particles are converted into carbonate, said carbonate being then continuously discharged as product.

In testimony whereof we affix our signatures, this 31st day of October 1923.

CARL SUNDSTROM.
GEORGE N. TERZIEV.